United States Patent
Webber et al.

(10) Patent No.: US 11,321,359 B2
(45) Date of Patent: May 3, 2022

(54) REVIEW AND CURATION OF RECORD CLUSTERING CHANGES AT LARGE SCALE

(71) Applicant: Tamr, Inc., Cambridge, MA (US)

(72) Inventors: Timothy Kwok Webber, Boston, MA (US); George Anwar Dany Beskales, Waltham, MA (US); Dennis Cunningham, North Reading, MA (US); Alan Benjamin Wagner Rodriguez, Guaynabo, PR (US); Liam Cleary, Dublin (IE)

(73) Assignee: TAMR, INC., Cambridge, MA (US)

( * ) Notice: Subject to any disclaimer, the term of this patent is extended or adjusted under 35 U.S.C. 154(b) by 243 days.

(21) Appl. No.: 16/706,086

(22) Filed: Dec. 6, 2019

(65) Prior Publication Data

US 2022/0004565 A1  Jan. 6, 2022

Related U.S. Application Data

(60) Provisional application No. 62/808,060, filed on Feb. 20, 2019.

(51) Int. Cl.
| | | |
|---|---|---|
| *G06F 16/28* | (2019.01) | |
| *G06F 16/2457* | (2019.01) | |
| *G06F 16/953* | (2019.01) | |
| *G06F 16/2455* | (2019.01) | |
| *G06F 16/2458* | (2019.01) | |
| *G06F 16/22* | (2019.01) | |

(52) U.S. Cl.
CPC ........ *G06F 16/285* (2019.01); *G06F 16/2282* (2019.01); *G06F 16/2456* (2019.01); *G06F 16/2465* (2019.01); *G06F 16/24573* (2019.01); *G06F 16/288* (2019.01); *G06F 16/953* (2019.01)

(58) Field of Classification Search
CPC ............ G06F 16/285; G06F 16/24573; G06F 16/953; G06F 16/288; G06F 16/2282
See application file for complete search history.

(56) References Cited

U.S. PATENT DOCUMENTS 5,870,559 A * 2/1999 Leshem ................. G06F 11/32
                                                    709/224
5,933,818 A * 8/1999 Kasravi ................. G06K 9/622
                                                    706/12

(Continued)

OTHER PUBLICATIONS

Charu et al., "A Framework for Clustering Evolving Data Streams" 2003, Proceedings of the 29th VLDB Conference.*

(Continued)

*Primary Examiner* — Debbie M Le
*Assistant Examiner* — Huen Wong
(74) *Attorney, Agent, or Firm* — Panitch Schwarze Belisario & Nadel LLP

(57) ABSTRACT

Methods are provided to represent proposed changes to clusterings for ease of review, as well as tools to help subject matter experts identify clusters that warrant review versus those that do not. These tools make overall assessment of proposed clustering changes and targeted curation practical at large scale. Use of these tools and method enables efficient data management operations when dealing with extreme scale, such as where entity resolution involves clusterings created from data sources involving millions of entities.

13 Claims, 10 Drawing Sheets

(56) References Cited

U.S. PATENT DOCUMENTS

| | | | | |
|---|---|---|---|---|
| 6,012,058 | A * | 1/2000 | Fayyad | G06K 9/6223 |
| 6,449,612 | B1 * | 9/2002 | Bradley | G06K 9/6221 |
| 6,636,499 | B1 * | 10/2003 | Dowling | H04L 12/4625 |
| | | | | 370/338 |
| 7,487,471 | B2 | 2/2009 | Wu | |
| 8,370,328 | B2 * | 2/2013 | Woytowitz | G06F 16/36 |
| | | | | 707/719 |
| 9,037,589 | B2 * | 5/2015 | Anderson | G06F 16/20 |
| | | | | 707/737 |
| 9,135,658 | B2 | 9/2015 | Sprague et al. | |
| 9,305,076 | B1 * | 4/2016 | Kadarkarai | G06F 16/285 |
| 9,361,355 | B2 * | 6/2016 | Anderson | G06F 16/278 |
| 10,803,105 | B1 * | 10/2020 | Beskales | G06K 9/6263 |
| 11,049,028 | B1 * | 6/2021 | Beskales | G06F 16/285 |
| 11,132,343 | B1 * | 9/2021 | Raack | G06F 16/9024 |
| 2002/0161869 | A1 * | 10/2002 | Griffin | G06F 9/3885 |
| | | | | 709/221 |
| 2008/0097731 | A1 * | 4/2008 | Lanes | G06Q 10/087 |
| | | | | 703/2 |
| 2008/0155335 | A1 * | 6/2008 | Klein | G06K 9/622 |
| | | | | 714/37 |
| 2009/0012970 | A1 * | 1/2009 | Ziv | G06F 16/35 |
| 2009/0208075 | A1 * | 8/2009 | Fischer | G06T 7/11 |
| | | | | 382/128 |
| 2009/0259652 | A1 * | 10/2009 | Yamane | G06F 16/9024 |
| 2012/0166317 | A1 * | 6/2012 | Karnik | G06Q 10/087 |
| | | | | 705/28 |
| 2012/0254179 | A1 * | 10/2012 | Cao | G06Q 30/02 |
| | | | | 707/737 |
| 2013/0311467 | A1 * | 11/2013 | Galle | G06F 40/247 |
| | | | | 707/737 |
| 2014/0037214 | A1 * | 2/2014 | Deolalikar | G06K 9/00442 |
| | | | | 382/197 |
| 2014/0039834 | A1 * | 2/2014 | Shibuya | G06F 11/22 |
| | | | | 702/183 |
| 2014/0052763 | A1 * | 2/2014 | Sato | G06F 3/0488 |
| | | | | 707/805 |
| 2015/0035823 | A1 * | 2/2015 | Arsan | G06T 11/206 |
| | | | | 345/419 |
| 2015/0142808 | A1 * | 5/2015 | Ren | G06K 9/6223 |
| | | | | 707/737 |
| 2015/0278241 | A1 * | 10/2015 | Bates-Haus | G06F 16/1748 |
| | | | | 707/692 |
| 2016/0117336 | A1 * | 4/2016 | Aron | G06F 16/1767 |
| | | | | 707/688 |
| 2017/0201907 | A1 * | 7/2017 | Okvist | H04W 28/0284 |
| 2017/0300995 | A1 * | 10/2017 | Wang | G06F 16/287 |
| 2017/0357909 | A1 * | 12/2017 | Willamowski | G06F 16/93 |
| 2018/0068222 | A1 * | 3/2018 | Brennan | G06N 5/022 |
| 2018/0075138 | A1 * | 3/2018 | Perram | G06F 16/93 |
| 2018/0293505 | A1 * | 10/2018 | Bouveyron | G06N 5/003 |
| 2019/0188212 | A1 * | 6/2019 | Miller | G06F 16/285 |
| 2019/0268215 | A1 * | 8/2019 | Tellado | H04L 41/0613 |

OTHER PUBLICATIONS

Akash Srivastava et al., "Clustering with a Reject Option: Interactive Clustering as Bayesian Prior Elicitation", Jun. 2016, Cornell University.*

Bhattacharya et al., "Collective Entity Resolution in Relational Data", University of Maryland (Year: 2007).*

* cited by examiner

FIG. 1A

| ID | Name | Size | Verified | Status | ... | Name | Size | Verified | Status | ... |
|---|---|---|---|---|---|---|---|---|---|---|
| 1 | Cluster 1 | | | | | | | | | |
| 2 | Cluster 2 | | | | | | | | | |
| ... | ... | | | | | | | | | |
| n | Cluster n | | | | | | | | | |
| Published Clustering | | | | | | Unpublished Clustering | | | | |

| Record ID | Data Field 1 | ... | Data Field z | Cluster ID | Cluster Name | Cluster Size | Cluster Verified | Cluster Status | ... |
|---|---|---|---|---|---|---|---|---|---|
| Row 1 | | | | | | | | | |
| Row 2 | | | | | | | | | |
| ... | | | | | | | | | |
| Row p | | | | | | | | | |
| Data | | | | Cluster Metadata | | | | | |

110

| Record ID | Published Cluster ID | Proposed Cluster | Similarity | Proposed Cluster ID |
|---|---|---|---|---|
| 1 | C1 | 1 | 0.667 | C1 |
| 2 | C1 | 1 | 0.667 | C1 |
| 3 | C1 | 2 | 0.167 | C2 |
| 4 | C2 | 2 | 0.5 | C2 |
| 5 | C2 | 2 | 0.5 | C2 |
| 6 | C3 | 3 | 0.5 | C3 |
| 7 | C3 | | | |
| 8 | C4 | | | |
| 9 | | 2 | | C2 |
| 11 | | 4 | | C5 |

REVIEW AND CURATION OF RECORD CLUSTERING CHANGES AT LARGE SCALE

CROSS-REFERENCE TO RELATED APPLICATIONS

This utility patent application claims priority from U.S. Provisional Patent Application No. 62/808,060 filed Feb. 20, 2019, the disclosure of which is incorporated by reference herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2019, Tamr.

BACKGROUND

Field of Technology

This relates to review of changes in clustering of records during entity resolution as part of data cleaning, particularly at large scale.

Background

An essential part of entity resolution is clustering: linking together all of the data records that refer to the same entity. This clustering can be published as a dataset. When a subsequent version of entity resolution is being prepared for publication, an essential question is how the clustering has changed from the previously published version. At small scale—the scale of a few hundred or low thousands of entities—these clusters can be manually reviewed to verify that changes in clustering accurately reflect real-world changes. At larger scales, such as millions of entities, manual review is impractical. Existing techniques to align clusters in the new clustering with the clusters in the previously published clustering do not scale to millions of entities, making any comparison impractical. User interfaces do not provide effective tools to enable identification and prioritization of a practical subset of clusters for review.

DESCRIPTION OF PRIOR ART

U.S. Patents

U.S. Pat. No. 7,487,471 (Wu) discloses, in the Abstract, "One implementation provides a method for providing a graphical user interface (GUI) that allows a user to view proposed modifications to a knowledge entity. The method includes displaying to the user a first representation of a first proposed modification to the knowledge entity, and displaying to the user a second representation of a second proposed modification to the knowledge entity, wherein the second representation is positioned in relation to the first representation to indicate whether a conflict exists between the first and second proposed modifications to the knowledge entity. If there is a visual indication of the conflict, the method further includes displaying a modified representation of the knowledge entity by applying either the first or the second proposed modification according to a user-adjustable decision criterion." This is focused on presentation of conflicts between proposed modifications.

U.S. Pat. No. 9,135,658 (Sprague et al.) discloses, in the Abstract, "Techniques are disclosed for prioritizing a plurality of clusters. Prioritizing clusters may generally include identifying a scoring strategy for prioritizing the plurality of clusters. Each cluster is generated from a seed and stores a collection of data retrieved using the seed. For each cluster, elements of the collection of data stored by the cluster are evaluated according to the scoring strategy and a score is assigned to the cluster based on the evaluation. The clusters may be ranked according to the respective scores assigned to the plurality of clusters. The collection of data stored by each cluster may include financial data evaluated by the scoring strategy for a risk of fraud. The score assigned to each cluster may correspond to an amount at risk." This is focused on cluster generation.

None of the above provides a system with efficient management of clustering changes to large-scale data sets.

BRIEF SUMMARY

This disclosure outlines tools and methods to represent proposed changes to clusterings for ease of review, as well as tools to help subject matter experts identify clusters that warrant review versus those that do not. These tools make overall assessment of proposed clustering changes and targeted curation practical at large scale. Use of these tools and method enables efficient data management operations when dealing with extreme scale, such as where entity resolution involves clusterings created from data sources involving millions of entities.

Features and Advantages

Clustering management tools include filters to clusters based on proposed changes, integrated with search and other filters. Such filters enable rapid identification and review of new clusters, clusters with new records added, clusters with old records removed, clusters with modifications to fields in existing records, clusters with no changes, and clusters slated for retirement. Subject matter experts use the search and other filters tools to identify clusters of interest, and then use cluster change filters to review proposed cluster changes within those clusters of interest.

Clustering management tools include a visual review of proposed cluster changes. Such display enables rapid identification of changes to values on records within the cluster, new records added to the cluster, records moving to the cluster from other clusters, records that have been deleted, and records moving from the cluster to other clusters. Subject matter experts use the visual review tools to quickly assess whether proposed cluster changes match expectations, and to do a detailed review of proposed changes.

Clustering management tools include a visual review of proposed cluster changes. Such display enables rapid identification of changes to values on records within the cluster, new records added to the cluster, records moving to the cluster from other clusters, records that have been deleted, and records moving from the cluster to other clusters. Subject matter experts use the visual review tools to quickly assess whether proposed cluster changes match expectations, and to do a detailed review of proposed changes.

BRIEF DESCRIPTION OF THE DRAWINGS

In the drawings, closely related figures and items have the same number but different alphabetic suffixes. Processes, states, statuses, and databases are named for their respective functions.

FIG. 1A shows a data structure for tracking metadata about published and proposed clusters.

FIG. 1B shows a data structure for a cluster table with flat data records include for rapid searching.

FIG. 3 shows a data table representing the published clusters, proposed clusters, data record, similarities and new cluster IDs of FIGS. 2A, 2B, and 2C.

FIG. 7 is a user interface for cluster review.

DETAILED DESCRIPTION, INCLUDING THE PREFERRED EMBODIMENT

Figure 2A:
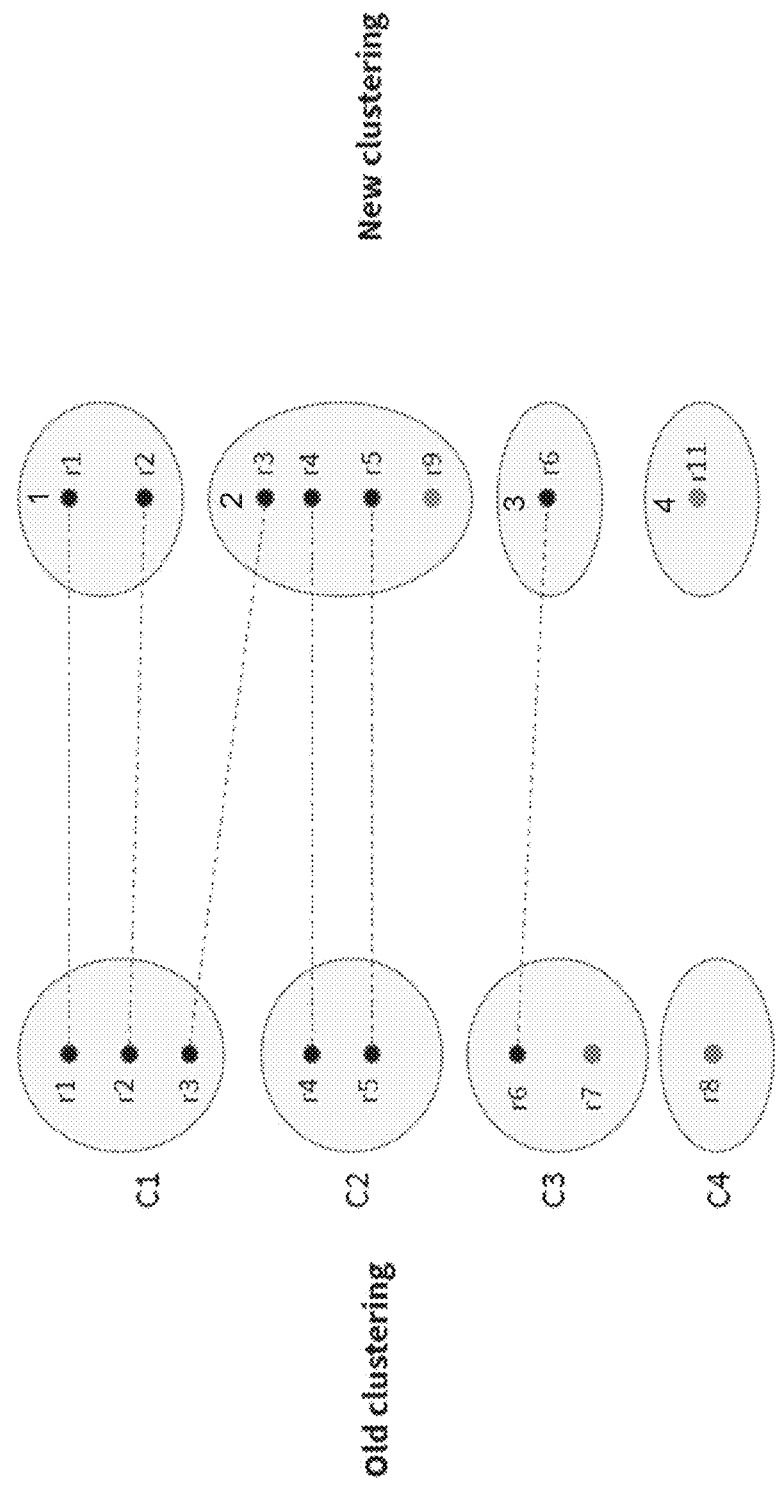
FIGS. 2A, 2B, and 2C show a new clustering proposed with changes from an old published clustering, evaluating similarities between the new and old clusters, and assigning cluster IDs to the new clusters.

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Operation

There are multiple aspects of scale that make this domain challenging. One is the number of clusters. Another is the number of records per cluster. Another is the number of clusters that have changed from the previously published clustering to the current clustering. The described system scales to tens of millions of clusters. The system scales to clusters with median size in the hundreds of records, and maximum size of tens of thousands of records. The system performs well even when tens of millions of clusters have changed.

The cluster management solution is preferably implemented within a data curation system, such as the system detailed in U.S. Pat. No. 9,542,412 (titled "Method and System for Large Scale Data Curation", issued Jan. 10, 2017, naming inventors Bates-Haus et al.) which is hereby fully incorporated by reference. The cluster management solution may be implemented as a software module within such a comprehensive data curation system, or as separate software operating on its own or within other systems.

A computing system operating the cluster management solution may be any single or multiple processor machine, or multiple network connected machines, with data input and output capabilities. Input can be direct, such as through disk, keyboard, or mouse, or indirect, such as over a network through an application programming interface (API) or webpage driven interface. Output may similarly be direct, such as display on a connected screen, or indirect such as written to disk or database for later or remotely connected access. A computing system may also be a virtual computing environment operating on top of physical hardware, such as within a cloud platform computing.

The cluster management solution may be implemented as a dedicated software application, or as user interface generation tools such as pages delivered by a web server. The cluster management solution provides user interface tools and controls to review and manage changes to clusters of data records when dealing with large scale records.

Curating large scale data records may involve handling many different data types from many different data sources. Data cleaning is process of correcting inaccurate data within the large scale data records. This may be necessary when initially undertaking curation, and also periodically thereafter to ensure data integrity. Part of data cleaning involves entity resolution, or identifying different data records from separate data sources as referring to the same entity. Clustering is the grouping together of these different data records.

Different techniques may be used to create an initial clustering. Once a first clustering exists, it is used within the system described to manage changes to the clustering over time. Once the initial clustering is completed as part of entity resolution, it may be stored as two datasets, one that embodies the mapping from source record to cluster, such as a table mapping record IDs to cluster IDs, and a second that lists the clusters and associated metadata, and published. The published clustering allows users of the curated system to access any clustered data of an entity based through interface tools, APIs, and access rights. The clustering management system retains a full copy of the published clustering. To minimize storage costs, a copy of only the most recent published clustering needs to be retained.

Referring to FIG. 1A, database table 100 may store cluster and metadata information. For each cluster, a name, id, and metadata fields including size, status, and verified. In addition, each field may be repeated for an unpublished clustering, which will be used for proposed clusterings which include changes from the initial published clustering. Different status states may include new, changed, unchanged, and empty. Cluster stats, such as size of cluster, may be calculated from the initial clustering.

The processing of the clustering and initial determination of cluster metadata is processed within an engine designed for handling large scale data processing, such as Apache Spark. Spark is designed for fast processing of large-scale data, but processing records and clusters is still a long-compute problem when dealing with massive data sources. Referring also to FIG. 1B, to efficiently interact with and search the published clustering and have access to underlying data records, a solution is to publish a flat table 110 to a highly efficient search engine such as Elasticsearch. Elasticsearch enables fast searching and web service integration, but does not perform well when performing joins or searching data being pulled from many tables of different formats. To create the flat table for Elasticsearch, Spark joins are used to flatten all fields for each data record into a table row within the table, and add the associated cluster table identification and metadata into that same row. The cluster table is then used as the Elasticsearch index. Search of the cluster table then allows rapid access to the information in the full data records, allowing efficient user interface response even when searching through millions of clusters and billions of data records. This efficient search speed comes at a cost of storage space—creation of the flat cluster table including all data from source records doubles the storage space required as data from the source records is replicated in the cluster table. This published clustering is retained immutably until a new proposed clustering is approved to replace it.

During continuing operation of the data curation system, new records arrive, old records are deleted, and existing records are modified. At some point, which typically is based on time (i.e., a periodic process) or degree of change detected (i.e., a monitored and triggered process), the data curation system may re-perform data cleaning and create a new or changed clustering. Creating the clustering is outside the scope of this disclosure, but once created it is considered a proposed clustering subject to review and approval of data experts.

Figure 2B:
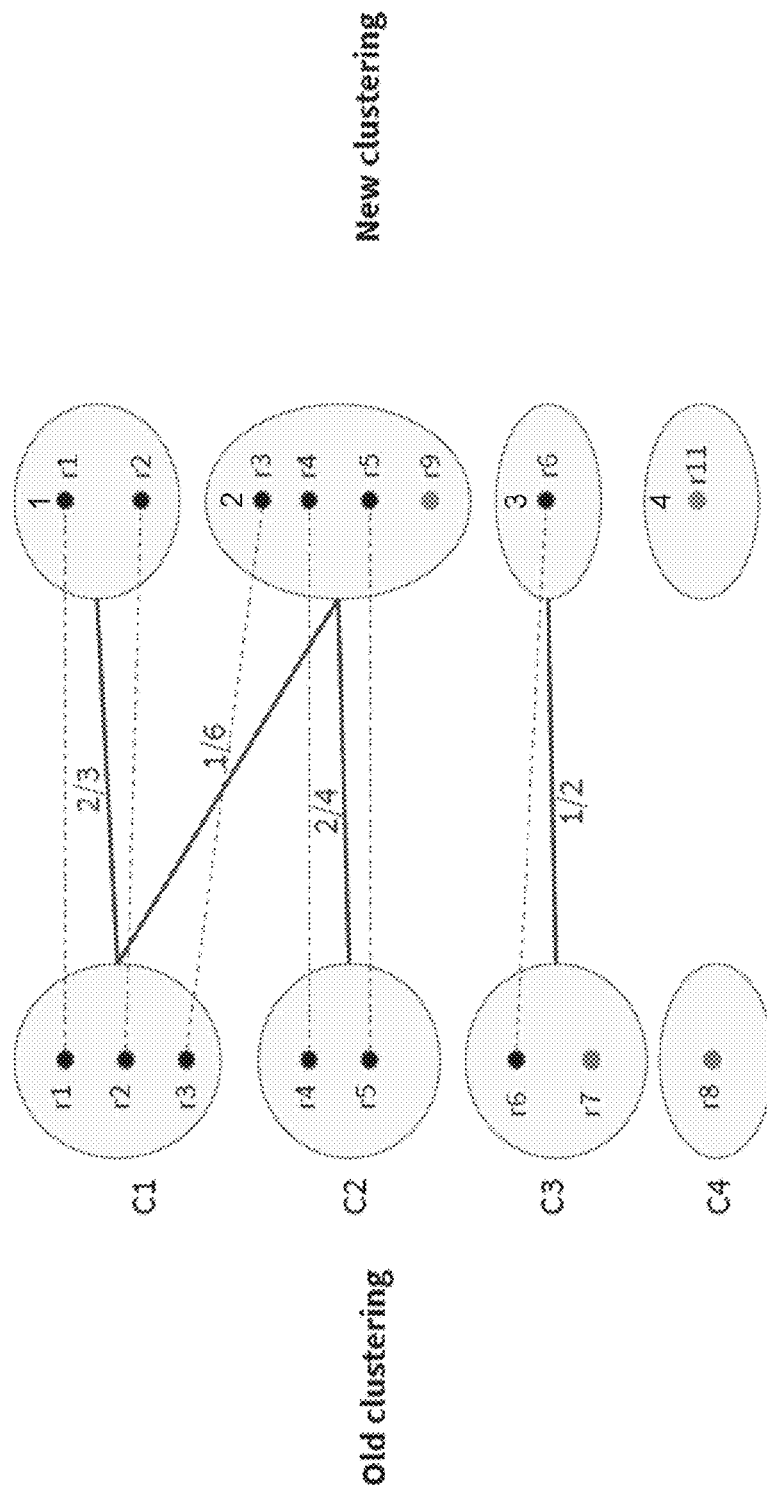
Figure 2C:
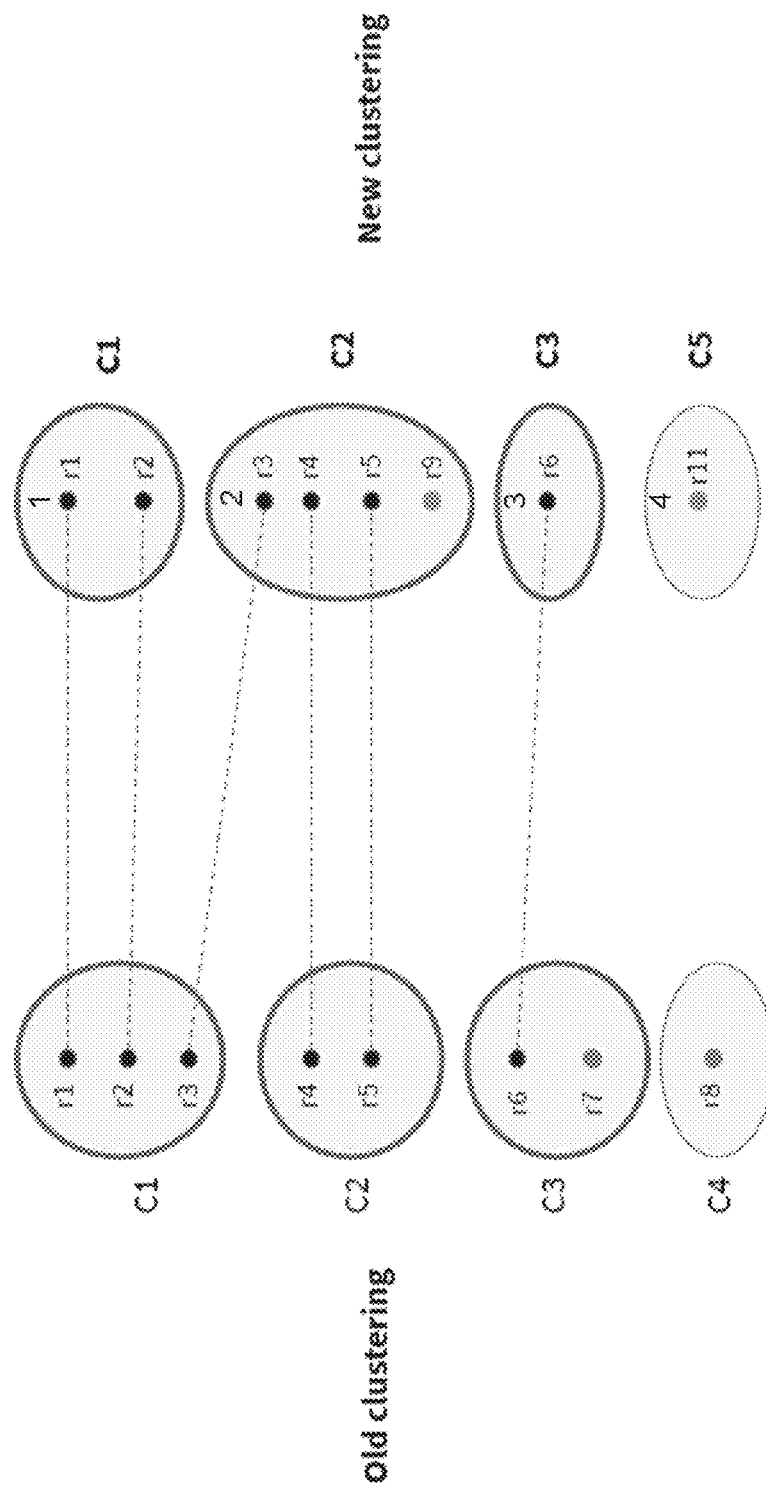

Upon receiving a proposed clustering, the cluster management software first aligns and compares the published and proposed clusters. This is an intensive process performed in Spark, typically taking multiple hours to complete. One part of the process is to assign cluster IDs to the clusters in the proposed clustering. Clusters having the exact same data set as a cluster in the published clustering receive that matching cluster ID. Where there are differences, a Jaccard Index is calculated scoring overlap between active (published clustering) clusters and next (proposed clustering) clusters. Clusters which have no overlap can be ignored during this step, simplifying the scale of the calculation. Once the score is computed, a best match comparison can be performed to find the proposed cluster having the greatest match to an active cluster. When there is a single best match, the active cluster ID is assigned to the proposed cluster ID. When there are multiple equal best matches, and no cluster repeats in any of the best match pairs, the active cluster ID is assigned to the next cluster ID for each best match pair. After an active cluster ID is assigned, it may be removed from consideration (as already having been assigned), and the process repeated by identifying a next best match and assigning that active cluster ID to the best matching proposed cluster. This process may continue until no more existing cluster IDs for active clusters which overlap proposed clusters remain. Any active clusters which do not have any overlap with next clusters may have their cluster ID retired, and then any next clusters which have not yet been assigned cluster IDs based on matching with active clusters may be assigned a new cluster ID. FIGS. 2A, 2B, 2C, and as charted in FIG. 3, illustrate the cluster ID assignment. There are four cluster pairs with overlap between published and proposed clusters: old cluster C1 overlaps with new clusters 1 and 2, old cluster C2 overlaps with new cluster 2, and old cluster C3 overlaps with new cluster 3. In the example, old cluster C1 includes records r1, r2, and r3, old cluster C2 includes records r4 and r5, old cluster C3 includes records r6 and r7, and old cluster C4 includes record r8. New proposed cluster 1 includes records r1 and r2, new proposed cluster 2 includes records r3, r4, r5, and r9, new proposed cluster 3 includes record r6, and new proposed cluster 4 includes record r11. This may be represented as O_C1={r1, r2, r3}, O_C2={r4, r5}, O_C3={r6, r7}, O_C4={r8}, N_1={r1, r2}, N_2={r3, r4, r5, r9}, N_3={r6} N_4=

O_C1 and N_1 have a Jaccard index of $\frac{O_{C1} \cap N_1}{O_{C1} \cup N_1} = 0.667$ O_C1 and N_2 have a Jaccard index of $\frac{O_{C1} \cap N_2}{O_{C1} \cup N_2} = 0.167$ P_C2 and N_2 have a Jaccard index of $\frac{O_{C2} \cap N_2}{O_{C2} \cup N_2} = 0.5$ P_C3 and N_3 have a Jaccard index of $\frac{O_{C3} \cap N_3}{O_{C3} \cup N_3} = 0.5$ The best match is between O_C1 and N_1, so cluster ID C1 is assigned to new cluster 1. Other possible matches for ID C1 may then be disregarded, with C1 already assigned as an ID. Then the best remaining match is then tied between O_C2 matched to N_2 and O_3 matched to N_3. Because there is no conflict (no cluster in common between the matching pairs), both ids may be assigned as matched (C2 to new cluster 2 and C3 to new cluster 3). New cluster 4 has no matches, so is assigned a new and previously unused cluster id (C5). Cluster C4 in the old clustering has no overlap with any proposed clusters, so its ID (C4) will not be carried forward.

In some cases, such as evenly split clusters, multiple best matches will occur where one or more clusters repeats in multiple best matching pairs. In such cases, a tie-breaking formula may be applied to see which next cluster is assigned the active cluster ID. One tie-breaking formula may be time-based, such as by calculating the average last modified timestamp for records in each next cluster, were last modified timestamps may be among the metadata tracked for each data record. Whichever next cluster among the best matches which has the oldest average last modified timestamp would win the tiebreaker and be assigned the active cluster ID. As an alternative or additional tiebreaker, an authoritative weight score may be calculated for proposed cluster pairs. For example, some data sources may be considered "authoritative" sources, and an authoritative source indicator may be tracked in metadata for each data record. An authoritative weight score may then be calculated based on an absolute count of authoritative records common to both a published and proposed cluster pair, or as a proportion out of total records. This authoritative score may then be used as a tiebreaker between best match cluster pairs.

The example illustrated in FIGS. 2 & 3 is a simple scenario which would not require the system described to solve. When scaled to tens of millions of clusters which average hundreds of records per cluster, and can reach tens of thousands of records per cluster, it is not possible to solve by hand. Additionally, optimizations are needed for modeling and calculations to be completed efficiently by the computing system. One way to handle this is to model as an assignment problem within Spark. Each cluster in the published and proposed clustering is represented as a node in a weighted bipartite graph. Edges in the graph connect clusters from the proposed clustering to clusters in the proposed clustering. The weight of each edge is the similarity between the connected cluster pair. The objective is to get a matching, which is a subset of the edges that do not have any overlapping nodes, such that the sum of weights of the selected edges is maximized. Different algorithms may be used to solve this, with the simplest being a greedy algorithm that iterates over the edges in descending order of weights, and accepts the obtained edges as part of the final matching whenever possible (i.e., if not overlapping with a previously selected edge). Runtime for this algorithm is O(|E|) where |E| is the number of edges. In order to parallelize the computation of the matching, first connected components of the bipartite graph which represent sub-graphs that are completely disjoint are found. Then the matching algorithm is applied in parallel on the resulting sub-graphs.

Performance of the matching can be improved, as well as quality of matches to proposed clusters, by truncating weak edges. By setting a minimum threshold for similarity scores (Jaccard index), it is possible to prevent weak similarities from being used in the cluster ID matching. This threshold is set such that every edge in the bipartite graph must have a weight greater than or equal to the threshold. This way, clusters that have a very few number of common members are not matched. Any edge with similarity score below the threshold may be removed from the bipartite graph, reducing the computation scale of the matching problem. Given a similarity range such as the Jaccard index between [0,1], the threshold may be configured within that same range [0,1]. Having a threshold equal to 0 means that no filtering is done. On the other hand, having a threshold equal to 1 indicates that two clusters just be exactly the same in order to be considered a candidate match. Different criteria for establishing similarity scores and the threshold may also be applied, such as the absolute overlap between cluster members for the similarity score, and the relative overlap for defining the threshold.

Figure 4:
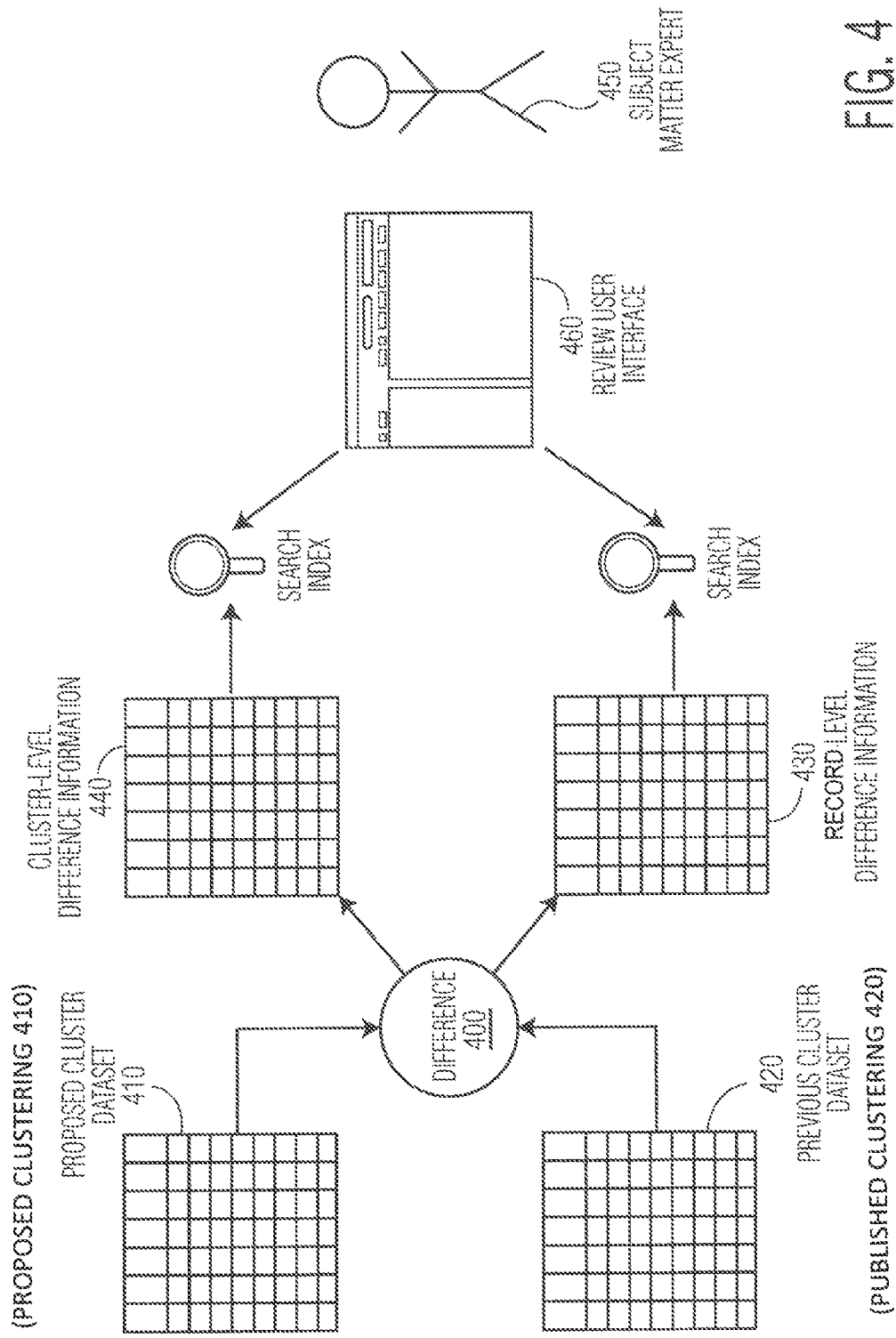
FIG. 4 is a diagram illustrating the workflow of cluster review.

With cluster IDs mapped between published and proposed clusters, the system then computes record-level differences between the published and proposed clusterings. Referring also to FIG. 4, a difference comparison 400 is performed in Spark comparing proposed clustering 410 with published clustering 420. This is a long-running process to identify both cluster and record changes. This process captures differences in three datasets: one 430 that captures at the record level current and previous cluster membership, record addition and deletion, and data changes to any field of the data record; and two 440 that capture cluster-level metadata for the current and previous clusterings, including the number of records added, removed, or changed. Tombstones may be used to track deleted records.

In addition to identifying differences with the published clustering, confidence metrics can be computed for each proposed cluster, based both on the strength of the internal connections within the cluster, and on the strength of inter-cluster connections, similar to the intra-cluster and inter-cluster metrics used in the Davies-Bouldin index. For example, pairwise correlation can be calculated based on similarity of record fields of all pairs within a cluster (intra-cluster), and the same calculation may be run on across different clusters (inter-cluster). These confidences may be calculated during creation of the proposed clustering. Preconfigured, or dynamically adjustable, thresholds may be set to identify clusters likely warranting manual review. These metrics are computed as part of cluster-level metadata when preparing for review. Clusters with poor intra-cluster scores indicate a weak cluster that has a risk of incorrectly containing unrelated records. Clusters with poor inter-cluster scores indicate a weak separation from other clusters that has a risk of incorrectly separating related records. Clusters that show a significant worsening in either score are likely to warrant manual review. Clusters with high scores are less likely to warrant manual review, and clusters with confidence over particular thresholds can be excluded from review.

The cluster-level differences and confidence metrics may be tracked as clustering metadata in data columns in table 100. A clustering table 110 for Elasticsearch may be created for the proposed clustering. In addition to the data fields for each data record, fields tracking metadata about changes to each record may be included. For performance optimizations, any unchanged clusters may re-use statistical metadata from the published clustering instead of recalculating. As a performance alternative to reduce storage space requirements, the proposed clustering table may be stored as changes from the published table, as opposed to storing a complete table.

With differences and confidence computed, the proposed clustering and changes are indexed for search and filtering and made accessible for subject matter data experts 450 review through user interface 460. Individual clusters and groups of clusters can be assigned to relevant subject matter experts for prioritized review, either manually or using rules or heuristics. Rules may be configured by an administrator on a source or user level, such as setting reviews for changes involving a specific data source to a specific reviewer. Similarly, past behavior can be tracked per user, and heuristics may suggest or automatically assign review to a specific data expert based on that expert substantially reviewing a particular data cluster or data from a particular source in prior cluster reviews. Substantial review may be recognized based on quantity (such as having made over a threshold of prior review actions) or percentage (such as exceeding a threshold percent of all review actions for a particular cluster or data source). Automated assignment may also factor confidence, such as only automatically assigning clusters below a certain confidence for review. An administrator may also manually assign clusters or groups of clusters for review to a data expert.

Figure 5:
FIG. 5 is a user interface for filtering which clusters are shown for review.
Figure 6:
FIG. 6 is a user interface for filtering which clusters are shown for review.

Data experts may access the cluster management system through a dedicated or webpage driven review application. Upon accessing, they may be presented a user interface with controls to view clusters and records based on cluster-level and record-level filter selection or text search. Referring also to FIG. 5, filters may include whether clusters have changes, and if so what type (new cluster, cluster with records added, cluster with records moved to or from other clusters, cluster with records deleted, or retired/deleted cluster); confidence, such as high/medium/low or a custom range; and various statuses, including assignment or lock condition. Referring also to FIG. 6, similar filters may be used to view records within a cluster, including display based on lock status, added from new sources, deleted from sources, moved to another cluster, remaining in the same cluster, or commented on by a reviewer.

Figure 7:
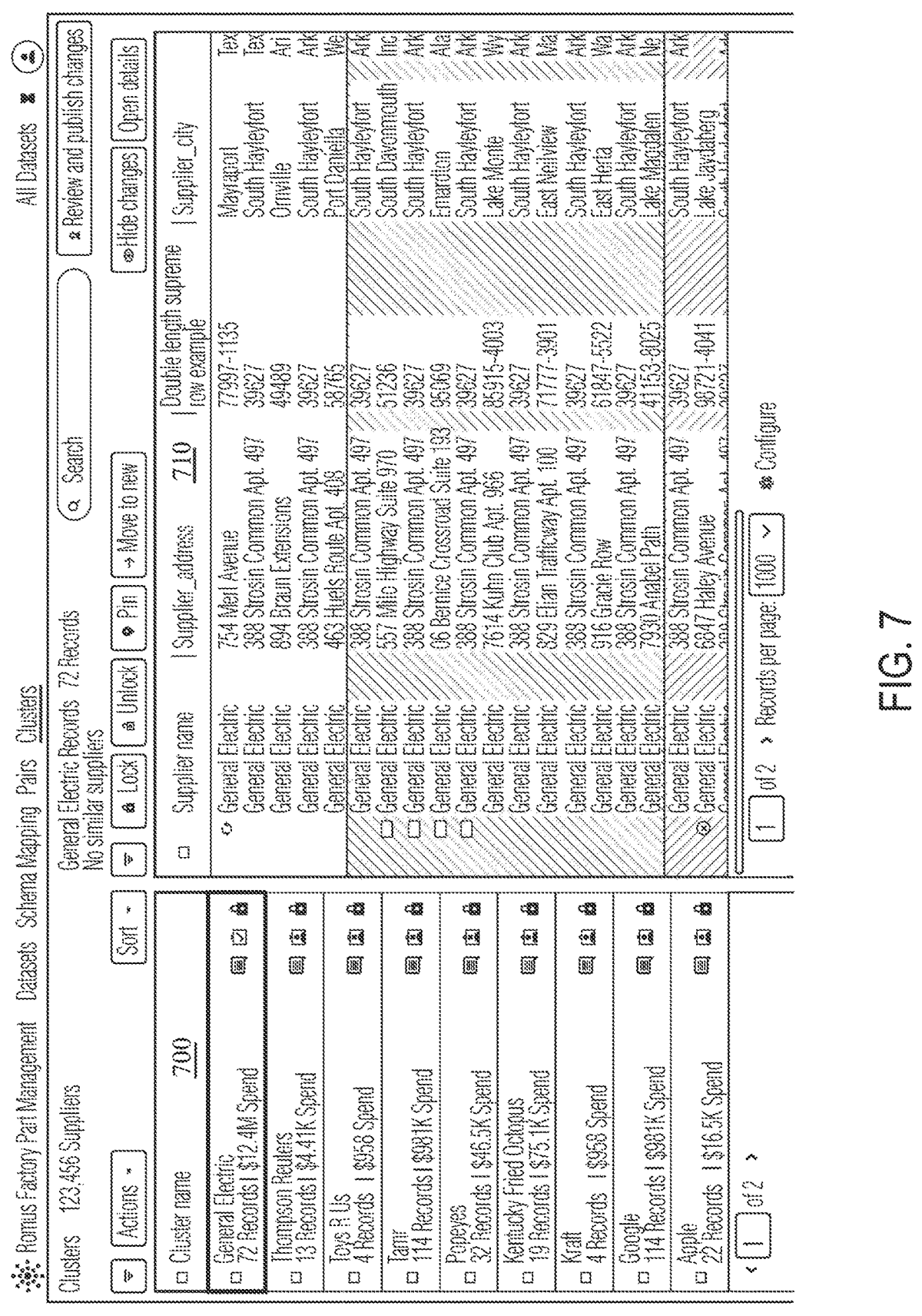

Referring also to FIG. 7, within the user interface of the review application, and as sorted based on search results and/or filter selections, clusters and their summary information may be displayed in one display region such as clustering pane 700, with records and detailed information from a selected cluster within another display region such as cluster pane 710. The clusters may be sorted based on any available field, including name, number of record, assigned status, locked status, and confidence. User interface display features, such as coloration or highlights, may identify: changes to values in records within the cluster; new records added to the cluster; records moving to the cluster from other clusters; records that have been deleted; and records moving from the cluster to other clusters. Selecting any specific record may access more details in a record detail pane (not shown), such as information about any previous or proposed cluster. Selection tools, such as buttons or drop-down menus, allow the data expert to move records back to an originating cluster or to a different cluster, or lock or unlock records preventing or allowing further clustering changes. Approval actions may be selected, via button or drop-down menus, to approve proposed changes to selected clusters.

After a data expert makes changes to the proposed clustering, the differences are recomputed, summary and detailed information updated, and indexing redetermined for filters and searching. As the scale of manual changes is minuscule compared to the entire dataset, changes can be made directly to the flat cluster table. After all proposed changes are approved the proposed clustering replaces the published clustering as a new published clustering. This may be executed directly by the clustering management software, or it may return the approved clustering for publication by the data curation system. At that point, a copy of the newly published clustering is retained by the clustering management software for change comparison when a new clustering is again proposed.

OTHER EMBODIMENTS

In another embodiment, the system enables filtering and review of changes between two clustering versions.

In another embodiment, the system enables filtering and review of changes between an arbitrary number of clustering versions. This provides the ability to review how clusters change over extended time periods.

In another embodiment, the system supports a variety of metrics or rules for determining how to align clusters between two versions.

In another embodiment, the system computes clusters, cluster differences, and metrics on streaming data. This provides the ability to flag clusters for review in response to cluster changes, rather than based on time or dataset changes.

Figure 8:
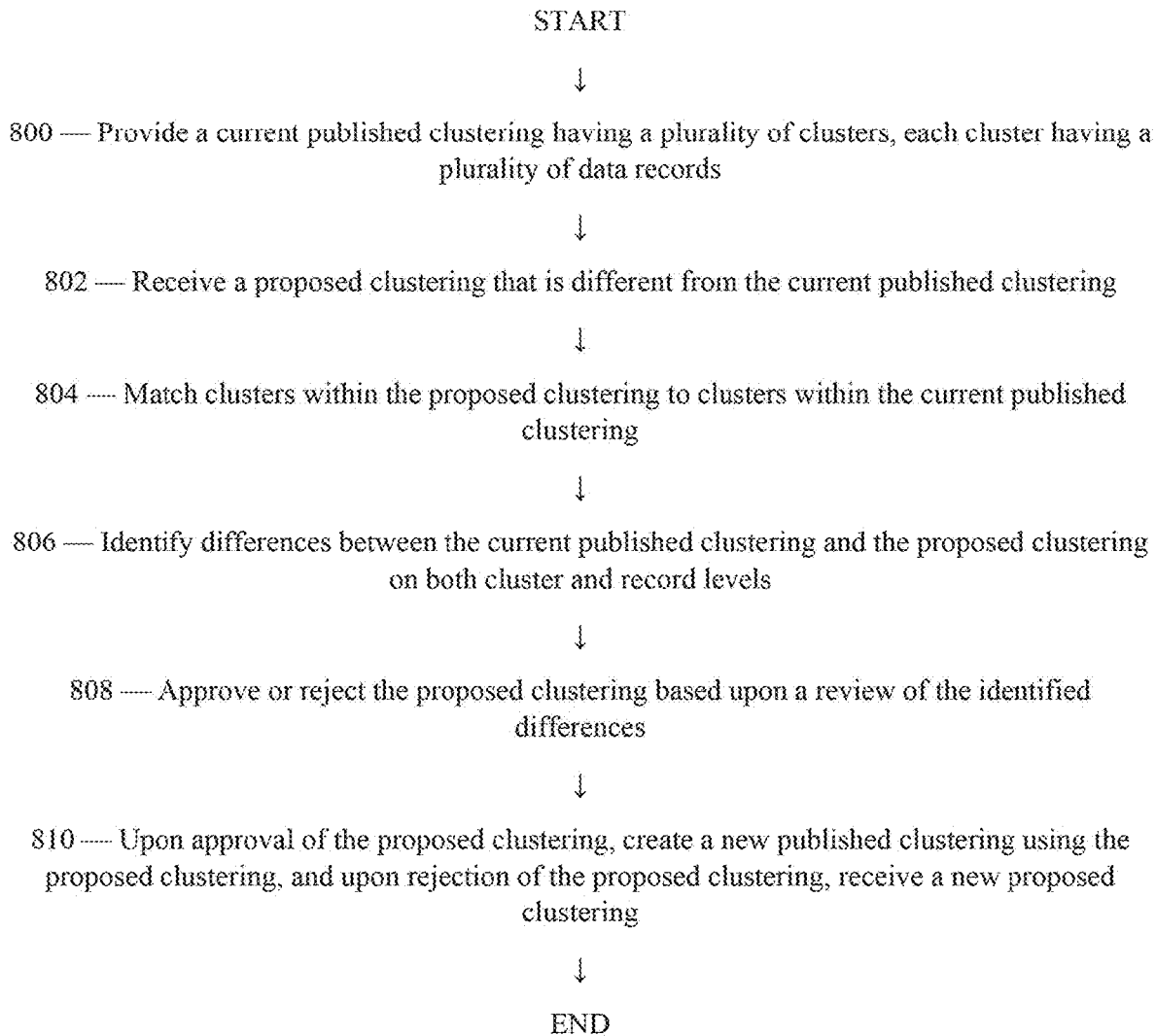
FIG. 8 is a flowchart of one preferred embodiment of the present invention.

FIG. 8 shows a flowchart of one preferred embodiment of the present invention for cluster management for large scale data records. A computer-implemented software program manages data to perform the following steps:

Step 800: Provide a current published clustering having a plurality of clusters, each cluster having a plurality of data records.

Step 802: Receive a proposed clustering that is different from the current published clustering. This may occur automatically or via human interaction.

Step 804: Match clusters within the proposed clustering to clusters within the current published clustering.

Step 806: Identify differences between the current published clustering and the proposed clustering on both cluster and record levels.

Step 808: Approve or reject the proposed clustering based upon a review of the identified differences.

Step 810: Upon approval of the proposed clustering, create a new published clustering using the proposed clustering, and upon rejection of the proposed clustering, receive a new proposed clustering.

The software program executes on any suitable computer processor or network of computer processors. The details of the flowchart steps were described in detail in FIGS. 1-8, and their corresponding descriptions.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:

1. A method of clustering management for large scale data records, comprising, within a computer-implemented software program to manage data:

providing a current published clustering, the current published clustering having a plurality of clusters, each cluster in the current published clustering having a first plurality of data records, wherein the data records in each cluster refer to the same entity, and wherein the plurality of clusters in the current published clustering define published clusters, and wherein the current published clustering is a current version of entity resolution, the current published clustering being a first dataset;

receiving a proposed clustering that is different from the current published clustering, the proposed clustering also having a plurality of clusters, each cluster in the proposed clustering having a second plurality of data records, wherein the plurality of clusters in the proposed clustering define proposed clusters, and wherein the proposed clustering is a subsequent version of entity resolution, the proposed clustering being a second dataset, wherein the second dataset differs from the first dataset in one or more of the following ways:
  (i) the second dataset includes one or more data records that are not present in the first dataset, or
  (ii) the second dataset does not include one or more data records that are present in the first dataset, or
  (iii) the second dataset includes one or more data records that are modified relative to the first dataset, wherein the modifications are data changes to fields of the data records;

matching clusters within the proposed clustering to clusters within the current published clustering;

identifying differences between the current published clustering and the proposed clustering on both cluster and record levels using the matched clusters, thereby identifying differences between the first and second datasets of the respective current published clustering and the proposed clustering, the identified differences including one or more of the following differences:
  (i) the second dataset includes one or more data records that are not present in the first dataset, or
  (ii) the second dataset does not include one or more data records that are present in the first dataset, or
  (iii) the second dataset includes one or more data records that are modified relative to the first dataset, wherein the modifications are data changes to fields of the data records;

approving or rejecting the proposed clustering based upon a review of the identified differences; and upon approval of the proposed clustering, creating a new published clustering using the proposed clustering, and upon rejection of the proposed clustering, receiving a new proposed clustering for subsequent review.

2. The method of claim 1, further comprising, within the software program:

storing metadata about the proposed clusters and the published clusters in a table, wherein the metadata includes cluster size, cluster verification, and cluster status, and wherein the cluster status is one of new, changed, unchanged, or empty.

3. The method of claim 2, wherein identifying differences further comprises:

computing differences between matched clusters and storing statistics about the differences within the metadata about the published clusters and proposed clusters.

4. The method of claim 3, wherein the computing of differences is further a record-level computation of differences between matched clusters, and the differences are used to:

update the metadata about the published clusters, including statistics on number of data records added, removed or changed, update the metadata about the proposed clusters, including statistics on number of data records added, removed, or changed from the matching published cluster, and update current and proposed cluster membership for each data record in a data table tracking data record cluster membership.

5. The method of claim 4, further comprising, within the software program:
creating the data table tracking data record cluster membership by performing, within a big data analytics platform, a join of all data fields for each data record along with cluster metadata for the published cluster and the proposed cluster containing the data record, and
storing the join results as a flat table optimized for fast searching and data retrieval within a search engine.

6. The method of claim 1, further comprising, within the software program:
computing confidence metrics in the clusters of the proposed clustering; and
storing the computed confidence metrics within metadata about the proposed clusters.

7. The method of claim 6, wherein computing confidence metrics further comprises:
computing intra-cluster confidence for each cluster through pairwise similarity of record fields across all pairs of data records within a cluster, and inter-cluster confidence for each cluster through pairwise similarity of record fields across all pairs of data records selected to pair data records in one cluster with data records from a different cluster.

8. The method of claim 7, further comprising, within the software program:
applying a threshold setting to the confidence metrics, or degree of change in confidence metrics between a published cluster and matching proposed cluster, to identify clusters warranting manual review, and excluding clusters not identified as warranting manual review from those requiring approval before the proposed clustering is accepted.

9. The method of claim 8, further comprising, within the software program:
after differences in proposed clusters warranting manual review have been approved, automatically approving the proposed clustering.

10. The method of claim 1, further comprising, within the software program:
providing a user interface to review and approve or reject the proposed clustering, the user interface including:
filter and search tools to identify clusters for review,
a clustering pane displaying proposed clusters and proposed cluster metadata,
a cluster pane displaying individual data records within a cluster selected from the clustering pane, and
a data record pane displaying data record details selected of a data record selected from the cluster pane, and
providing tools within the user interface to:
undo a change in a proposed clustering,
move a data record to a different cluster,
edit the data record details,
lock a data record,
lock a proposed clustering,
assign proposed clusters for review by a particular individual, and
approve a proposed clustering.

11. The method of claim 10, further comprising, within the user interface:
displaying visual indication through color or displayed symbols of data record status within the cluster pane, wherein visual indication of status includes:
data record unchanged from the published clustering,
data record new to the proposed cluster,
data record new to the published clustering,
data record moved out of the proposed cluster, and
data record deleted from the published clustering.

12. The method of claim 1, further comprising, within the software program:
storing source data records for the current published clustering and the proposed clustering within a big data analytics platform.

13. The method of claim 1, further comprising, within the software program:
assigning a cluster ID of a matching cluster in the published clustering to the matching cluster in the proposed clustering, and assigning previously unused cluster IDs to clusters in the proposed clustering having no match in the published clustering.

* * * * *